United States Patent
Song et al.

(10) Patent No.: US 8,279,221 B2
(45) Date of Patent: *Oct. 2, 2012

(54) 3D GRAPHICS PROCESSOR AND AUTOSTEREOSCOPIC DISPLAY DEVICE USING THE SAME

(75) Inventors: Myoung-Seop Song, Yongin-si (KR); Jang-Doo Lee, Yongin-si (KR); Hyoung-Wook Jang, Yongin-si (KR); Hui Nam, Yongin-si (KR); Beom-Shik Kim, Yongin-si (KR)

(73) Assignee: Samsung Display Co., Ltd., Yongin (KR)

( * ) Notice: Subject to any disclaimer, the term of this patent is extended or adjusted under 35 U.S.C. 154(b) by 885 days.

This patent is subject to a terminal disclaimer.

(21) Appl. No.: 11/499,424

(22) Filed: Aug. 4, 2006

(65) Prior Publication Data

US 2007/0030264 A1 Feb. 8, 2007

(30) Foreign Application Priority Data

Aug. 5, 2005 (KR) .................. 10-2005-0071602
Sep. 26, 2005 (KR) .................. 10-2005-0089406

(51) Int. Cl.
*G06T 15/20* (2011.01)
*G06T 15/10* (2011.01)
*G06T 15/00* (2011.01)

(52) U.S. Cl. ........................ 345/427; 345/419

(58) Field of Classification Search ............ None
See application file for complete search history.

(56) References Cited

U.S. PATENT DOCUMENTS

| | | | |
|---|---|---|---|
| 4,601,053 A | 7/1986 | Grumet | |
| 4,896,210 A | 1/1990 | Brokenshire et al. | |
| 5,255,211 A | 10/1993 | Redmond | |
| 5,581,665 A * | 12/1996 | Sugiura et al. | 700/251 |
| 5,864,342 A | 1/1999 | Kajiya et al. | |
| 5,959,663 A | 9/1999 | Oba et al. | |
| 5,982,375 A * | 11/1999 | Nelson et al. | 345/419 |

(Continued)

FOREIGN PATENT DOCUMENTS

CN 1277698 A 12/2000

(Continued)

OTHER PUBLICATIONS

European Search Report dated Nov. 10, 2006, for 06118463.6, in the name of Samsung SDI Co., Ltd.

(Continued)

*Primary Examiner* — Daniel Hajnik
(74) *Attorney, Agent, or Firm* — Christie, Parker & Hale, LLP (57) ABSTRACT

A stereoscopic image display device displays a stereoscopic image by generating stereoscopic image data based on 3D graphics data. The stereoscopic image display device includes a display unit for displaying an image, a driver, and a controller. The controller receives a synchronization signal, the 3D graphics data, and a user selection parameter for modifying a stereoscopic effect level, and outputs a control signal based on the synchronization signal and a stereoscopic image data signal, which is generated by combining left eye image data and right eye image data generated through performing matrix operations on the 3D graphics data and the user selection parameter, to the driver. The driver drives the display unit based on the control signal and the stereoscopic image data signal to display the stereoscopic image on the display unit.

32 Claims, 6 Drawing Sheets

U.S. PATENT DOCUMENTS

| | | | |
|---|---|---|---|
| 6,011,581 A | 1/2000 | Swift et al. | |
| 6,014,472 A | 1/2000 | Minami et al. | |
| 6,094,216 A | 7/2000 | Taniguchi et al. | |
| 6,108,005 A * | 8/2000 | Starks et al. | 345/419 |
| 6,172,686 B1 | 1/2001 | Mizutani | |
| 6,175,379 B1 | 1/2001 | Uomori et al. | |
| 6,204,876 B1 | 3/2001 | Uomori et al. | |
| 6,477,267 B1 * | 11/2002 | Richards | 382/154 |
| 6,496,183 B1 | 12/2002 | Bar-Nahum | |
| 6,515,662 B1 | 2/2003 | Garland | |
| 6,593,959 B1 | 7/2003 | Kim et al. | |
| 6,624,813 B1 | 9/2003 | Wang | |
| 6,631,205 B1 | 10/2003 | Melen et al. | |
| 6,640,004 B2 | 10/2003 | Katayama et al. | |
| 7,058,252 B2 | 6/2006 | Woodgate et al. | |
| 7,268,747 B2 | 9/2007 | Taniguchi et al. | |
| 7,371,163 B1 | 5/2008 | Best | |
| 7,391,417 B2 * | 6/2008 | Osako | 345/419 |
| 7,545,380 B1 * | 6/2009 | Diard et al. | 345/505 |
| 2001/0020946 A1 | 9/2001 | Kawakami et al. | |
| 2001/0043226 A1 | 11/2001 | Visser et al. | |
| 2002/0105484 A1 | 8/2002 | Navab et al. | |
| 2002/0154214 A1 * | 10/2002 | Scallie et al. | 348/51 |
| 2002/0191000 A1 | 12/2002 | Henn | |
| 2002/0196251 A1 * | 12/2002 | Duluk et al. | 345/420 |
| 2003/0048354 A1 | 3/2003 | Takemoto et al. | |
| 2003/0160780 A1 | 8/2003 | Lefebvre et al. | |
| 2004/0004616 A1 | 1/2004 | Konya et al. | |
| 2004/0027452 A1 | 2/2004 | Yun et al. | |
| 2004/0032980 A1 | 2/2004 | Harman | |
| 2004/0169670 A1 | 9/2004 | Uehara et al. | |
| 2004/0212612 A1 | 10/2004 | Epstein et al. | |
| 2004/0239685 A1 * | 12/2004 | Kiyokawa et al. | 345/619 |

FOREIGN PATENT DOCUMENTS

| | | |
|---|---|---|
| CN | 1496177 A | 5/2004 |
| EP | 0 583 060 A2 | 2/1994 |
| EP | 0 583 060 A3 | 2/1994 |
| EP | 0 607 000 A2 | 7/1994 |
| EP | 0 751 689 A2 | 1/1997 |
| EP | 0 751 689 A3 | 1/1997 |
| EP | 0 963 122 A2 | 12/1999 |
| EP | 1 406 456 A2 | 4/2004 |
| EP | 1 406 456 A3 | 1/2006 |
| JP | 03-119889 | 5/1991 |
| JP | 04-077882 | 3/1992 |
| JP | 07-322305 | 12/1995 |
| JP | 09-074573 | 3/1997 |
| JP | 10-232953 | 9/1998 |
| JP | 2001-155182 | 6/2001 |
| JP | 2002-024856 | 1/2002 |
| JP | 2002-519792 | 7/2002 |
| JP | 2003-047027 | 2/2003 |
| JP | 2003-070022 | 3/2003 |
| JP | 2003-169351 | 6/2003 |
| JP | 2004-120165 | 4/2004 |
| JP | 2004-165710 | 6/2004 |
| JP | 2004-280078 | 10/2004 |
| JP | 2004-289681 | 10/2004 |
| JP | 2005-011275 | 1/2005 |
| KR | 10-0239132 | 10/1999 |
| KR | 10-2001-0023290 | 3/2001 |
| KR | 10-2003-0088513 | 11/2003 |
| KR | 10-0456952 | 11/2004 |
| KR | 10-2005-0078737 | 8/2005 |
| WO | WO 97/23097 | 6/1997 |
| WO | WO 98/43442 | 10/1998 |
| WO | WO 00/00934 | 1/2000 |
| WO | WO 2004/051307 A2 | 6/2004 |
| WO | WO 2005/013623 | 2/2005 |

OTHER PUBLICATIONS

European Search Report dated Nov. 2, 2006, for European application EP 06116595.7.

U.S. Office action dated Dec. 8, 2008, for related U.S. Appl. No. 11/480,646.

Korean Patent Abstracts, Publication No. 100239132, dated Oct. 19, 1999, in the name of Je Man Kim.

U.S. Office action dated May 22, 2009, for related U.S. Appl. No. 11/480,646.

European Search Report dated Oct. 24, 2006 for European Patent application 06116598.1.

U.S. Office action dated Dec. 23, 2008, for related U.S. Appl. No. 11/480,730.

U.S. Office action dated Jun. 11, 2009, for related U.S. Appl. No. 11/480,730.

U.S. Office action dated Jan. 21, 2010, for related U.S. Appl. No. 11/480,730.

U.S. Office action dated Nov. 17, 2010, for cross-reference U.S. Appl. No. 11/480,730.

U.S. Office action dated Feb. 7, 2011, for cross reference U.S. Appl. No. 11/480,646.

Japanese Office action dated Jun. 28, 2011, for Japanese Patent application 2006-171871, corresponding to cross-reference U.S. Appl. No. 11/480,730, 2 pages, Paragraph 0048 of cited reference 6 and Fig. 2 disclose a "mobile phone equipped with 3D face display device".

Takushi, I., *3D displayer that is unnecessary glasses, which is developed by a Sanyo*, Nikkei Electronics, Japan Nikkei Business Publications, Inc., Oct. 24, 1994, vol. 620, pp. 109-112.

Minoru, Y., *3D Television that is unnecessary glasses*, NHK Giken Dayori, Science and Technical Research Laboratories, Japan Broadcasting Corporation, Dec. 1, 1992, vol. 35, pp. 2-7, p. 2 discloses, "3D display without glasses", and Fig. 1 uses a "parallax barrier method".

* cited by examiner

3D GRAPHICS PROCESSOR AND AUTOSTEREOSCOPIC DISPLAY DEVICE USING THE SAME

CROSS-REFERENCE TO RELATED APPLICATIONS

This application claims priority to and the benefit of Korean Patent Applications Nos. 10-2005-0071602 and 10-2005-0089406 respectively filed on Aug. 5, 2005 and Sep. 26, 2005 in the Korean Intellectual Property Office, the contents of both of which are incorporated herein by reference.

BACKGROUND OF THE INVENTION (a) Field of the Invention

The present invention relates to a stereoscopic image display device, and more particularly, to a stereoscopic image display device for generating stereoscopic image data and displaying a stereoscopi image based on three-dimensional (3D) graphics data.

(b) Description of the Related Art

In general, people perceive a stereoscopic effect physiologically and experientially. In three-dimensional image display technology, a stereoscopic effect of an object is produced by using binocular parallax, which is a primary factor in recognizing a stereoscopic effect at a short distance. Stereoscopic images are viewed by a stereoscopic method involving wearing of spectacles or by an autostereoscopic method not involving wearing of spectacles.

The stereoscopic method is classified into an anaglyph method involving wearing of spectacles having blue and red lenses on respective sides, a polarization method involving wearing of polarizing spectacles having different polarization directions, and a time-division method involving wearing of spectacles including an electronic shutter that is synchronized with time-divided frames. However, the stereoscopic method requires the inconvenience of wearing the spectacles and causes difficulty in viewing objects other than the stereoscopic image. Accordingly, the autostereoscopic method that does not involve the wearing of spectacles has been actively developed.

Typical autostereoscopic methods include a lenticular method in which a lenticular lens plate having an array of vertically arranged cylindrical lenses is formed in front of an image panel, and a parallax barrier method that separates left eye and right eye images using a barrier to obtain a stereoscopic effect.

When using stereoscopic image display devices that are capable of selectively displaying a two-dimensional (2D) image or a stereoscopic image, 2D image data and stereoscopic image data are typically provided from an external device to the stereoscopic image display device. Therefore, there has been a problem in that the 2D image data and the stereoscopic image data have to be separately generated. For example, the stereoscopic image data is provided to a stereoscopic image display device after converting 3D graphics data for a 2D image (i.e., the 3D graphics data including 3D space coordinate and texture information of an object to be stereoscopically displayed on a flat screen) into the stereoscopic image data. Further, there has been a problem in that additional storage units are required for respectively storing the input 2D image data or stereoscopic image data in the stereoscopic image display device. Accordingly, it has been difficult to commercialize the stereoscopic image display device due to the above problems.

The above information disclosed in this Background section is only for enhancement of understanding of the background of the invention and therefore it may contain information that does not form the prior art that is already known in this country to a person of ordinary skill in the art.

SUMMARY OF THE INVENTION

An aspect of the present invention is to provide a stereoscopic image display device for displaying a stereoscopic image by generating stereoscopic image data based on input 3D graphics data. Another aspect of the present invention is to provide a driving method of a stereoscopic image display device for displaying a stereoscopic image based on input 3D graphics data. Yet another aspect of the present invention is to provide a 3D graphics processor for generating stereoscopic image data by using 3D graphics data.

An exemplary stereoscopic image display device according to an embodiment of the present invention includes a first matrix generator, a second matrix generator, a first matrix operator, a second matrix operator, a first rendering engine, a second rendering engine, a memory unit, and a driver. The first matrix generator generates a first matrix based on a 3D graphics transformation matrix and a user selection parameter. The second matrix generator generates a second matrix based on the 3D graphics transformation matrix and the user selection parameter. The first matrix operator generates first view space coordinate information using 3D space information of 3D graphics data and the first matrix, and the second matrix operator generates second view space coordinate information using the 3D space information of the 3D graphics data and the second matrix. The first rendering engine generates first view image data using the first view space coordinate information and texture information of the 3D graphics data, and the second rendering engine generates second view image data using the second view space coordinate information and the texture information of the 3D graphics data. The memory unit stores the first view image data and the second view image data. The driver receives the first and second view image data from the memory unit, and drives the display unit to display an image corresponding to the first and second view image data.

An exemplary 3D graphics data processor according to an embodiment of the present invention includes a geometric engine, a rendering engine, and a memory unit. The geometric engine generates space coordinate information by using space information of 3D graphics data, the rendering engine generates image data using the space coordinate information output from the geometric engine and texture information of the 3D graphics data, and the memory unit stores the image data output from the rendering engine. The space coordinate information includes left eye image coordinate information and right eye image coordinate information. The geometric engine includes a first matrix generator, a second matrix generator, a first matrix operator, and a second matrix operator. The first matrix generator generates a left eye matrix for left eye image coordinate information based on a 3D graphics transformation matrix and a user selection parameter. The second matrix generator generates a right eye matrix for right eye image coordinate information based on the 3D graphics transformation matrix and the user selection parameter. The first matrix operator performs an operation on the left eye matrix and the space information of the 3D graphics data, and outputs the left eye image coordinate information, and the second matrix operator performs an operation on the right eye matrix and the space information of the 3D graphics data, and outputs the right eye image coordinate information.

An exemplary 3D graphics data processor for processing 3D graphics data of a first frame and a second frame subsequent to the first frame according to another embodiment of the present invention includes a geometric engine, a rendering engine, and a memory unit. The geometric engine generates space coordinate information by performing a matrix operation on space information of 3D graphics data of the first and second frames, the rendering engine generates image data using the space coordinate information output from the geometric engine and texture information of the 3D graphics data, and the memory unit stores the image data output from the rendering engine. The geometric engine includes a first matrix generator, a second matrix generator, a generator selector, a first matrix operator, and a second matrix operator. The first matrix generator generates a first matrix based on a 3D graphics transformation matrix and a user selection parameter. The second matrix generator generates a second matrix based on the 3D graphics transformation matrix and the user selection parameter. The generator selector transmits the 3D graphics transformation matrix to the first matrix generator for a first frame period, and transmits the 3D graphics transformation matrix to the second matrix generator for a second frame period. The first matrix operator performs an operation on the first matrix and the space information of the 3D graphics data for the first frame period, and outputs first coordinate information, and the second matrix operator performs an operation on the second matrix and the space information of the 3D graphics data for the second frame period, and outputs second coordinate information.

An exemplary 3D graphics data processor for processing 3D graphics data according to a further embodiment of the present invention includes a first rendering engine, a second rendering engine, a first memory, a second memory, and a memory selector. The first rendering engine generates first image data using texture information of the 3D graphics data and first coordinate information calculated by using space information of the 3D graphics data. The second rendering engine generates second image data using the texture information of the 3D graphics data and second coordinate information calculated by using the space information of the 3D graphics data. The first memory stores the first image data, the second memory stores, based on a control signal, both the first and second image data or either the first image data or the second image data, and the memory selector transmits the first image data output from the first rendering engine to the first memory or the second memory based on the control signal.

An exemplary stereoscopic image display device according to a still further embodiment of the present invention includes a display unit, a driver, and a controller. The display unit displays an image. The controller receives a synchronization signal, 3D graphics data, and a user selection parameter for modifying a stereoscopic effect level, and outputs a control signal based on the synchronization signal, and a stereoscopic image data signal generated by combining left eye image data and right eye image data generated by performing matrix operations using the 3D graphics data and the user selection parameter. The driver drives the display unit based on the control signal and the stereoscopic image data signal to display the image on the display unit.

DETAILED DESCRIPTION OF THE EMBODIMENTS

Exemplary embodiments of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims which follow, unless explicitly described to the contrary, the word "comprise" or variations such as "comprises" or "comprising" will be understood to imply the inclusion of stated elements but not the exclusion of any other elements.

Figure 1:
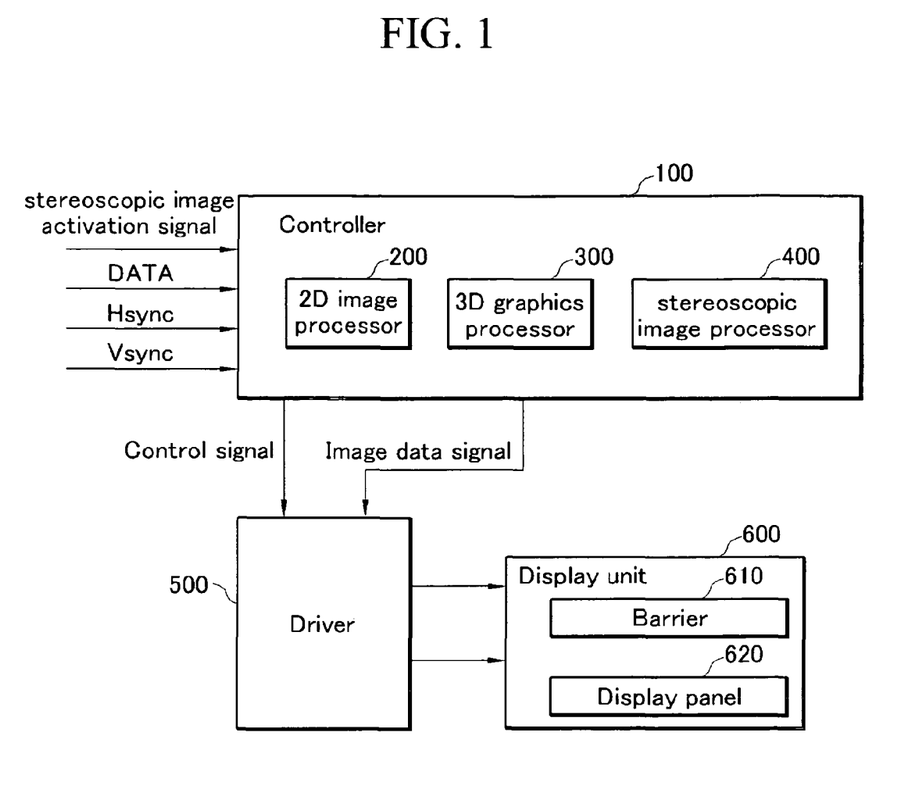
FIG. 1 shows a schematic view of a stereoscopic image display device according to an exemplary embodiment of the present invention.

FIG. 1 shows a schematic view of a stereoscopic image display device according to an exemplary embodiment of the present invention.

As shown in FIG. 1, the stereoscopic image display device according to the exemplary embodiment of the present invention is for selectively displaying a two-dimensional (2D) image and a stereoscopic image, and it includes a controller 100, a driver 500, and a display unit 600.

The controller 100 externally receives image data DATA, a horizontal synchronization signal Hsync, a vertical synchronization signal Vsync, and a stereoscopic image activation signal, and generates a control signal and an image data signal to provide the generated signals to the driver 500. The image data DATA input to the controller 100 may include at least one of 2D image data, 3D graphics data including 3D space coordinate and surface information of an object to be stereoscopically displayed on a flat screen, or 3D stereoscopic image data including image data for respective viewpoints. The stereoscopic image may be displayed according to a state of the stereoscopic image activation signal. That is, the stereoscopic image is displayed when the stereoscopic image activation signal is in an activated state, and the 2D image is displayed when it is in an inactivated state. Alternatively, the stereoscopic image may be displayed according to an input of the stereoscopic image activation signal. That is, the stereoscopic image is displayed when the stereoscopic image activation signal is input, and the 2D image is displayed when no stereoscopic image activation signal is input. Hereinafter, the stereoscopic image display according to the state of the stereoscopic image activation signal will be described. While it has been described that the stereoscopic image activation signal is externally input along with the image data DATA, the stereoscopic image activation signal may be generated by the controller 100 based on a user's selection.

The controller 100 includes a 2D image processor 200, a 3D graphics processor 300, and a stereoscopic image processor 400. The 2D image data signal is generated by the 2D image processor 200 and is output to the driver 500 when the 2D image data is input, and the stereoscopic image data signal is generated by the stereoscopic image processor 400 and is output to the driver 500 along with the stereoscopic image activation signal when the stereoscopic image data and the stereoscopic image activation signal are input.

In addition, the image data is generated by the 3D graphics processor 300 when the 3D graphics data is input. In further detail, the 3D graphics processor 300 generates the stereoscopic image data based on the 3D graphics data when receiving the stereoscopic image activation signal in an activated state and the 3D graphics data, and outputs the generated stereoscopic image data and the stereoscopic image activation signal to the driver 500. In addition, the 3D graphics processor 300 generates the 2D image data based on the 3D graphics data when receiving the stereoscopic image activation signal in an inactive state and the 3D graphics data, and outputs the generated 2D image data to the driver 500. Accordingly, the 2D image or the stereoscopic image is selectively displayed on the display unit 600 when the 3D graphics data is input.

The driver 500 drives a barrier 610 and a display panel 620 in the display unit 600 so that the 2D image or the stereoscopic image may be displayed on the display unit 600 based on the control signal and the data signal input from the controller 100. In more detail, the driver 500 drives the display panel 620 so that an image can be displayed on the display panel 620 based on the image data signal input from the controller 100. Further, when receiving the stereoscopic image activation signal in the activated state from the controller 100, the driver 500 drives the barrier 610 to have a transparent region (or multiple transparent regions) and an opaque region (or multiple opaque regions). When receiving the stereoscopic image activation signal in the inactivated state, the driver 500 drives the barrier 610 so that whole of the barrier 610 becomes a transparent region.

The display unit 600 includes the barrier 610 and the display panel 620. The barrier 610 is driven by the driver 500 so that the barrier 610 may include the transparent and opaque regions, or may become the transparent region according to the state of the stereoscopic image activation signal, for example. The display panel 620 displays an image corresponding to the image data signal from the driver 500.

Figure 2:
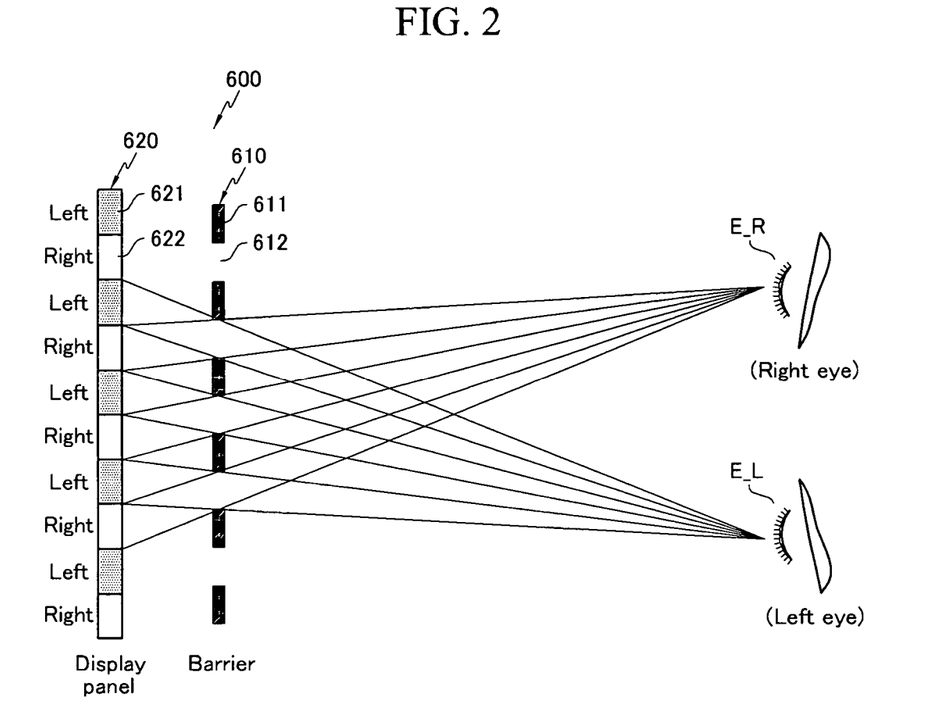
FIG. 2 schematically shows a diagram representing a display panel according to the exemplary embodiment of the present invention.

FIG. 2 schematically shows a diagram representing the display panel according to the exemplary embodiment of the present invention.

As shown in FIG. 2, the display unit 600 includes the barrier 610 and the display panel 620, the display panel 620 includes a plurality of display pixels 621 and 622, and the barrier 610 includes a plurality of regions 611 and 612. For example, the barrier 610 may be formed by a liquid crystal shutter for transmitting and shutting an image by controlling molecular arrangement thereof.

When the 2D image is displayed, an image corresponding to the 2D image data is displayed on the respective pixels of the display panel 620, and the image displayed on the display panel 620 is transmitted through the barrier 610 since all of the regions 611 and 612 of the barrier 610 become transparent.

When the stereoscopic image is displayed, a left eye image Left is displayed on the display pixels 621 and a right eye image Right is displayed on the display pixels 622. In addition, the regions 611 become opaque regions and the regions 612 become transparent regions. Therefore, a left eye E_L of an observer may see the left eye image Left of the display pixels 621 through the transparent regions 612 of the barrier 610, and a right eye E_R of the observer may see the right eye image Right of the display pixels 622 through the transparent regions 612 of the barrier 610. As described, since the observer may see different images through the two eyes, the observer may perceive a stereoscopic effect by a disparity caused between the left and right eyes. While the exemplary embodiment of the present invention has been described in connection with a stereoscopic image for two viewpoints, the spirit of the present invention may be applied to multiple viewpoints of three or more. In addition, while the barrier is used in the exemplary embodiment of the present invention, a lens array may be used instead.

The 3D graphics processor for processing the 3D graphics data input from the stereoscopic image display device according to the exemplary embodiment of the present invention will be described with reference to FIG. 3 and FIG. 4.

Figure 3:
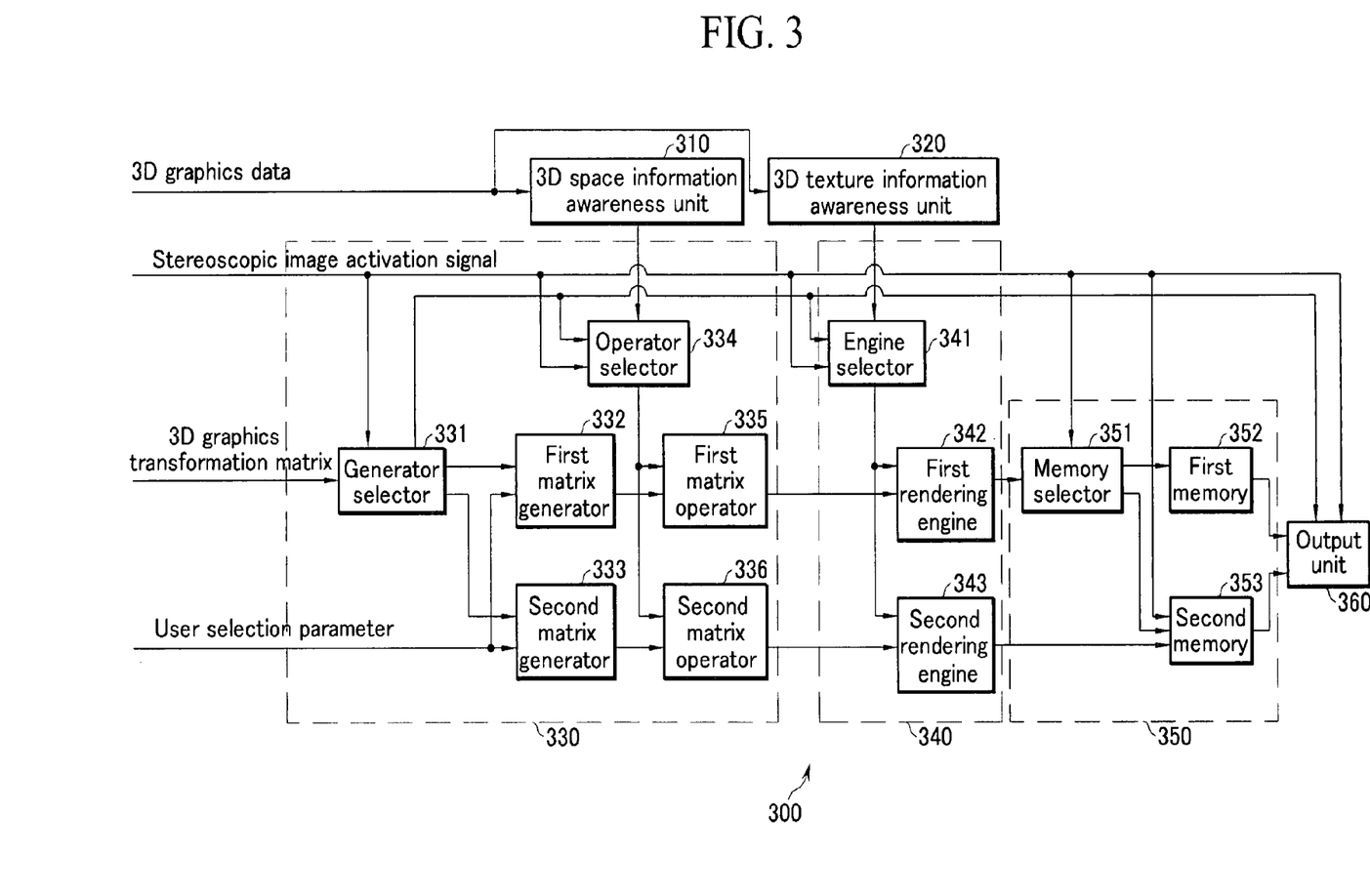
FIG. 3 schematically shows a block diagram representing a 3D graphics processor according to the exemplary embodiment of the present invention.
Figure 4:
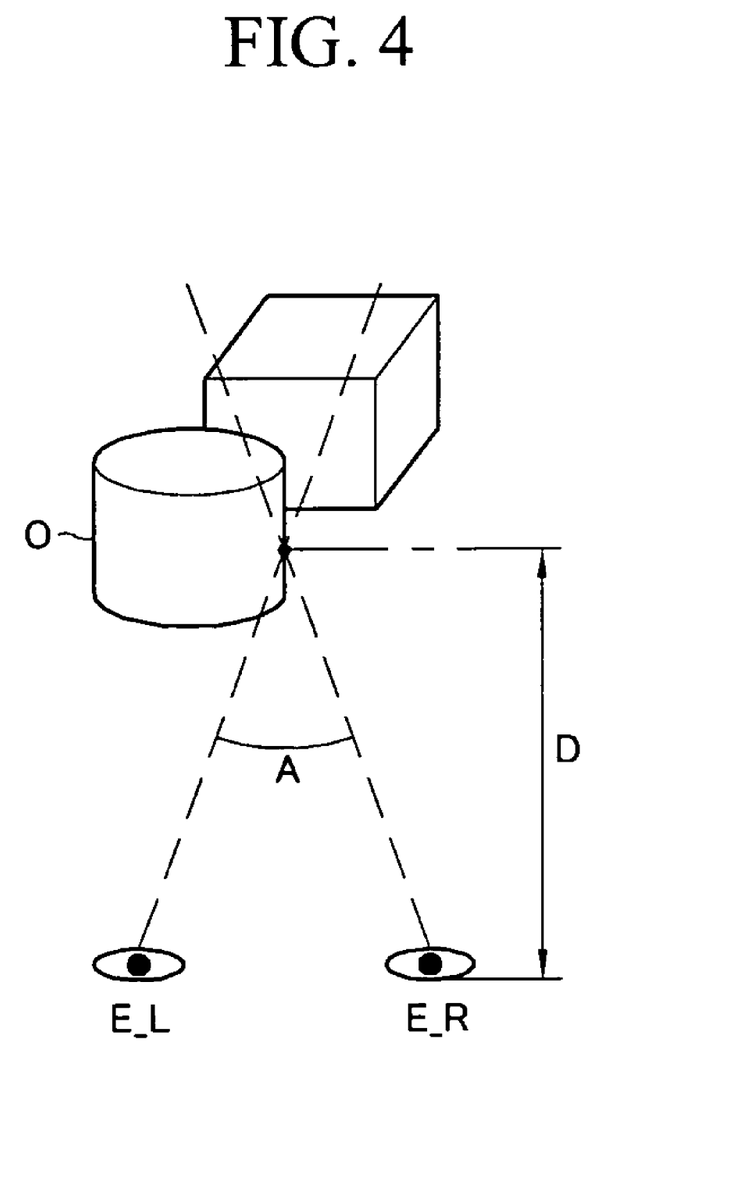
FIG. 4 shows a diagram representing user selection parameters according to the exemplary embodiment of the present invention.

FIG. 3 schematically shows a diagram representing the 3D graphics processor 300 shown in FIG. 1, and FIG. 4 shows a diagram representing user selection parameters.

As shown in FIG. 3, the 3D graphics processor 300 receives the 3D graphics data, the stereoscopic image activation signal, a 3D graphics transformation matrix for drawing 3D graphics, and a user selection parameter to generate the 2D image data or the stereoscopic image data as the 3D graphics. The 3D graphics processor 300 includes a 3D space information awareness unit 310, a 3D texture information awareness unit 320, a geometric engine 330, an image generator 340, an image combiner 350, and an output unit 360. The 3D graphics transformation matrix is a series of transformation data expressing a shape and movement of a three-dimensional object, which may have been calculated and defined. The 3D graphics transformation matrix is used to change a location, a direction, and/or a size of the object on a display screen.

The 3D space information awareness unit 310 extracts space information (e.g., information on space coordinates) from the externally input 3D graphics data. The 3D texture information awareness unit 320 extracts texture information from the input 3D graphics data.

The geometric engine 330, which is an accumulator for operating the 3D space information, uses the input 3D graphics transformation matrix, the stereoscopic image activation signal, and the user selection parameter to modify the space coordinate information obtained from the space information awareness unit 310. The space coordinate information may be modified, and a modification level may be set according to the user's selection. For example, a left eye image matrix for calculating a coordinate for observing the object from a left side of the observer and a right eye image matrix for calculating a coordinate for observing the object from a right side of the observer are generated, and left eye image data and right eye image data that are modified by respective operations on the 3D graphics data with the left and right eye image matrixes are generated.

In more detail, the geometric engine 330 includes a generator selector 331, a first matrix generator 332, a second matrix generator 333, an operator selector 334, a first matrix operator 335, and a second matrix operator 336.

The generator selector 331 transmits the 3D graphics transformation matrix to the first matrix generator 332 and the second matrix generator 333 based on the stereoscopic image activation signal. In more detail, the generator selector 331 alternately transmits the 3D graphics transformation matrix to the first matrix generator 332 and the second matrix generator 333 when 2D image is displayed, since the stereoscopic image activation signal is in the inactive state. In addition, the generator selector 331 generates and outputs a selection signal informing of where the 3D graphics transformation matrix is transmitted. For example, the selection signal is 1 when the 3D graphics transformation matrix is transmitted to the first matrix generator 332, and the selection signal is 0 when the 3D graphics transformation matrix is transmitted to the second matrix generator 333.

In addition, the generator selector 331 transmits the 3D graphics transformation matrix concurrently to the first matrix generator 332 and the second matrix generator 333 when the stereoscopic image is displayed, since the stereoscopic image activation signal is in the active state. The 3D graphics transformation matrix may be information included in the externally input 3D graphics data.

The first matrix generator 332 and the second matrix generator 333 respectively generate and output the left and right eye image matrixes for respectively generating left eye image coordinate information and right eye image coordinate information when the stereoscopic image is displayed. For example, the left and right eye image matrixes may be generated by an operation on the 3D graphics transformation matrix and a user matrix based on the user selection parameter (or user selection parameters).

In addition, the first matrix generator 332 and the second matrix generator 333 output the 3D graphics transformation matrix when the 2D image is displayed. For example, an angle of the user selection parameter, e.g., the angle between two eyes, may be set to 0 when the 2D image is displayed, and therefore the user matrix based on the user selection parameter may be used as a unit matrix. Accordingly, the first matrix generator 332 and the second matrix generator 333 output the 3D graphics transformation matrix as a result of the operation on the 3D graphics transformation matrix and the unit matrix. As illustrated in FIG. 4, in an exemplary embodiment, the user selection parameters include an angle A formed by a left eye E_L of an observer, the object O, and a right eye E_R of the observer, and a distance D between the object O and the observer. The angle A and the distance D may be selected by the observer when the stereoscopic image is displayed. The angle A may be set to 0 when a 2D image is displayed.

The operator selector 334 outputs the 3D space information received from the 3D space information awareness unit 310 to the first matrix operator 335 and the second matrix operator 336 based on the selection signal and the stereoscopic image activation signal output by the generator selector 331.

For example, when the stereoscopic image activation signal is in the inactive state and the selection signal is 1 (i.e., the 3D graphics transformation matrix is transmitted to the first matrix generator 332), the operator selector 334 outputs the 3D space information in a current frame to the first matrix operator 335. On the other hand, when the stereoscopic image activation signal is in the inactive state and the selection signal is 0 (i.e., the 3D graphics transformation matrix is transmitted to the second matrix generator 333), the operator selector 334 outputs the 3D space information in the current frame to the second matrix operator 336. When the stereoscopic image activation signal is in the active state, the operator selector 334 transmits the 3D space information concurrently to the first matrix operator 335 and the second matrix operator 336 regardless of the selection signal.

The first matrix operator 335 and the second matrix operator 336 generate and output triangle-shaped left eye image coordinate information and triangle-shaped right eye image coordinate information after operating on the 3D space information and the matrixes respectively input from the first matrix generator 332 and the second matrix generator 333.

As described above, the geometric engine 330 generates and outputs the coordinate information for the 2D image data or the stereoscopic image data by performing the matrix operations.

The image generator 340 includes an engine selector 341, a first rendering engine 342, and a second rendering engine 343. The engine selector 341 transmits the texture information output by the 3D texture information awareness unit 320 to the first rendering engine 342 and the second rendering engine 343 based on the selection signal and the stereoscopic image activation signal output by the generator selector 331.

For example, when the stereoscopic image activation signal is in the inactive state and the selection signal is 1 (i.e., the 3D graphics transformation matrix is transmitted to the first matrix generator 332), the engine selector 341 outputs the 3D texture information in the current frame to the first rendering engine 342. On the other hand, when the stereoscopic image activation signal is in the inactive state and the selection signal is 0 (i.e., the 3D graphics transformation matrix is transmitted to the second matrix generator 333), the engine selector 341 outputs the 3D texture information in the current frame to the second rendering engine 343. When the stereoscopic image activation signal is in the active state, the engine selector 341 transmits the 3D texture information concurrently to the first rendering engine 342 and the second rendering engine 343 regardless of the selection signal.

The first rendering engine 342 performs a rendering operation of combining the texture information with the coordinate information in a spanning method after receiving the left eye image coordinate information output by the first matrix operator 335 and the texture information output by the 3D texture information awareness unit 320. In addition, the second rendering engine 343 performs another rendering operation by combining the texture information with the coordinate information in the spanning method after receiving left eye image coordinate information output by the second matrix operator 336 and the texture information output by the 3D texture information awareness unit 320. The spanning method is to calculate a starting point and an ending point of a predetermined Y coordinate and a predetermined X coordinate, and to then respectively increase the calculated starting and ending points by one so that the texture information may be increased and stored in the memory.

The image generator 340 generates the coordinate information for the 2D image data or stereoscopic image data by performing the rendering operation, and outputs the generated coordinate information.

The image combiner 350 includes a memory selector 351, a first memory 352, and a second memory 353. The memory selector 351 determines whether to store the input image data in the first memory 352 or in the second memory 353 based on the stereoscopic image activation signal. For example, when the stereoscopic image activation signal is in the inactive state, the memory selector 351 stores the image data output by the first rendering engine 342 in the first memory 352. On the other hand, when the stereoscopic image activation signal is in the active state, the memory selector 351 stores the image data output by the first rendering engine 342 in the second memory 353.

The first memory 352 is a frame memory for storing the 2D image data frame by frame.

The second memory 353 is a frame memory for storing the 2D image data or the stereoscopic image data frame by frame based on the stereoscopic image activation signal. In more detail, when the stereoscopic image activation signal is in the inactive state, the second memory 353 operates in a like manner as the first memory 352, and when the stereoscopic image activation signal is in the active state, the second memory 353 operates as a stereoscopic image frame memory in which a space for storing the left eye image data and a space for storing the right eye image data are respectively separated.

Therefore, when the 2D image is displayed, the image combiner 350 stores the image data of the current frame in the first memory 352 and the image data of a subsequent frame in the second memory 353. On the other hand, when the stereoscopic image is displayed, the image combiner 350 stores the left and right eye image data of one frame in the second memory 353.

The output unit 360 outputs the image data stored in one of the first memory 352 and the second memory 353 to the driver 500 shown in FIG. 1. For example, when the stereoscopic image activation signal is in the inactive state and the selection signal is 1 (i.e., the 3D graphics transformation matrix is transmitted to the first matrix generator 332), the output unit 360 outputs the image data stored in the first memory 352. When the stereoscopic image activation signal is in the inactive state and the selection signal is 0 (I.e., the 3D graphics transformation matrix is transmitted to the second matrix generator 333), the output unit 360 outputs the image data stored in the second memory 353. When the stereoscopic image activation signal is in the active state, the output unit 360 outputs the image data stored in the second memory 353 regardless of the selection signal.

Accordingly, the output unit 360 alternately outputs the image data stored in the first memory 352 and the second memory 353 to the driver 500 when the 2D image is displayed, and the output unit 360 outputs the image data stored in the second memory 353 to the driver 500 when the stereoscopic image is displayed.

An operation of the 3D graphics processor 300 will be described with reference to FIG. 5 and FIG. 6.

Figure 5:
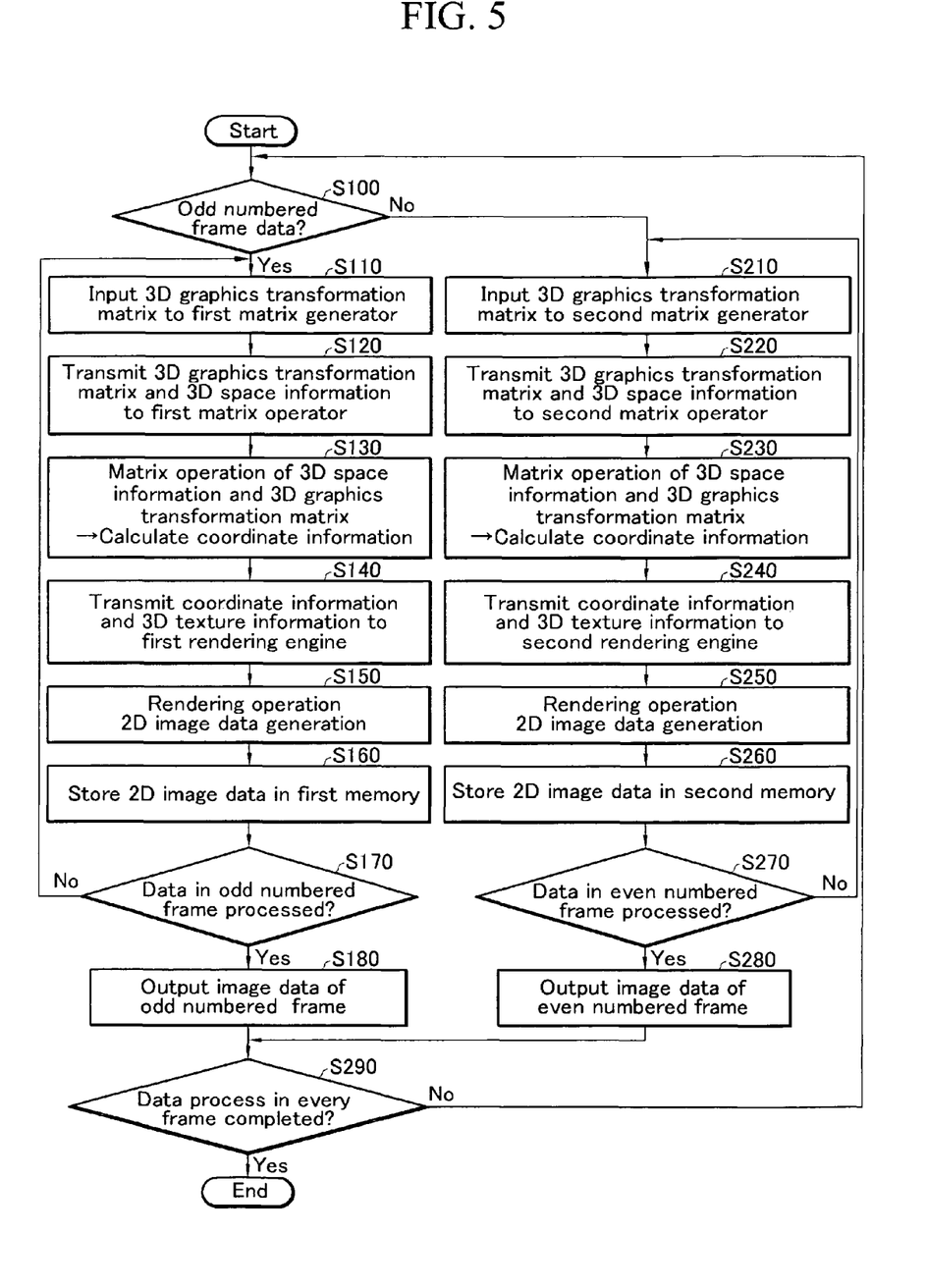
FIG. 5 shows a flowchart representing a process for generating 2D image data by the 3D graphics processor according to the exemplary embodiment of the present invention when a stereoscopic image activation signal is in an inactive state.

FIG. 5 shows a flowchart illustrating a process for generating the 2D image data by the 3D graphics processor according to the exemplary embodiment of the present invention when the stereoscopic image activation signal is in the inactive state. The process of FIG. 5 will be described in reference to the 3D graphics processor 300 of FIG. 3.

As shown in FIG. 5, the generator selector 331 determines in step S100 whether data to be processed is odd-numbered frame data.

When the data to be processed is odd-numbered frame data, the 3D graphics transformation matrix is input to the first matrix generator 332 (S110).

In addition, the first matrix generator 332 transmits the 3D graphics transformation matrix to the first matrix operator 335 based on the user parameter having the angle A of 0, and the operator selector 334 transmits the 3D space information received from the 3D space information awareness unit 310 to the first matrix operator 335 (S120).

The first matrix operator 335 calculates the coordinate information (S130) by performing the matrix operation of the input 3D space information and the 3D graphics transformation matrix.

The first rendering engine 342 receives the coordinate information and texture information respectively from the first matrix operator 335 and the 3D texture information awareness unit 320 (S140), and generates the 2D image data by performing the rendering operation (S150).

The generated 2D image data is stored in the first memory 352 by the memory selector 351 (S160).

Then, the generator selector 331 determines (S170) whether all the image data of the current frame have been processed. For example, the generator selector 331 may determine this based on the synchronization signal or the control signal input from the controller 100 shown in FIG. 1.

The process of S110 to S170 in FIG. 5 are repeatedly performed when it is determined that all the image data of the current frame have not yet been processed. When it is determined that all the image data of the current frame have been processed, the output unit 360 may output the image data of one frame (i.e., odd numbered frame) to the driver 500 shown in FIG. 1 (S180).

On the other hand, when it is determined (S100) that the data to be processed is not odd-numbered frame data (i.e., when it is determined to be even-numbered frame data), the 3D graphics transformation matrix is input to the second matrix generator 333 (S210).

In addition, the second matrix generator 333 transmits the 3D graphics transformation matrix to the second matrix operator 336 based on the user parameter having the angle A of 0, and the operator selector 334 transmits the 3D space information received from the 3D space information awareness unit 310 to the second matrix operator 336 (S220).

The second matrix operator 336 calculates the coordinate information (S230) by performing the matrix operation of the input 3D space information and the 3D graphics transformation matrix.

The second rendering engine 343 receives the coordinate information and texture information respectively from the second matrix operator 336 and the 3D texture information awareness unit 320 (S240), and generates the 2D image data (S250) by performing the rendering operation.

The generated 2D image data is stored in the second memory 353 by the memory selector 351 (S260). The second memory 353 operates as a memory for the 2D image based on the stereoscopic image activation signal of the inactive state.

Then, the generator selector 331 determines (S270) whether all the image data of the current frame have been processed.

The process of S210 to S270 of FIG. 5 are repeatedly performed when it is determined that all the image data of the current frame have not yet been processed. When it is determined that all the image data of the current frame have been processed, the output unit 360 may output the image data of one frame (i.e., even numbered frame) to the driver 500 shown in FIG. 1 (S280).

It is determined whether processes for the image data of all the frames have been completed (S290), and the process of S100 to S180 and the process of S210 to S290 are repeatedly performed when it is determined that the processes have not yet been completed. When the processes for the image data of all the frames have been completed, the operation of the 3D graphics processor 300 is finished.

As described, since an image generation process of a subsequent frame may be started before an image generation process of a previous frame is completed when the 3D graphics is displayed as a 2D image by using the 3D graphics data in the stereoscopic image display device according to the exemplary embodiment of the present invention, a display speed of the 2D image is increased and an image quality may be increased. While it has been classified as the odd-numbered and even-numbered frames to describe the exemplary embodiment of the present invention, the present invention is not limited thereto and covers variations and modifications.

Figure 6:
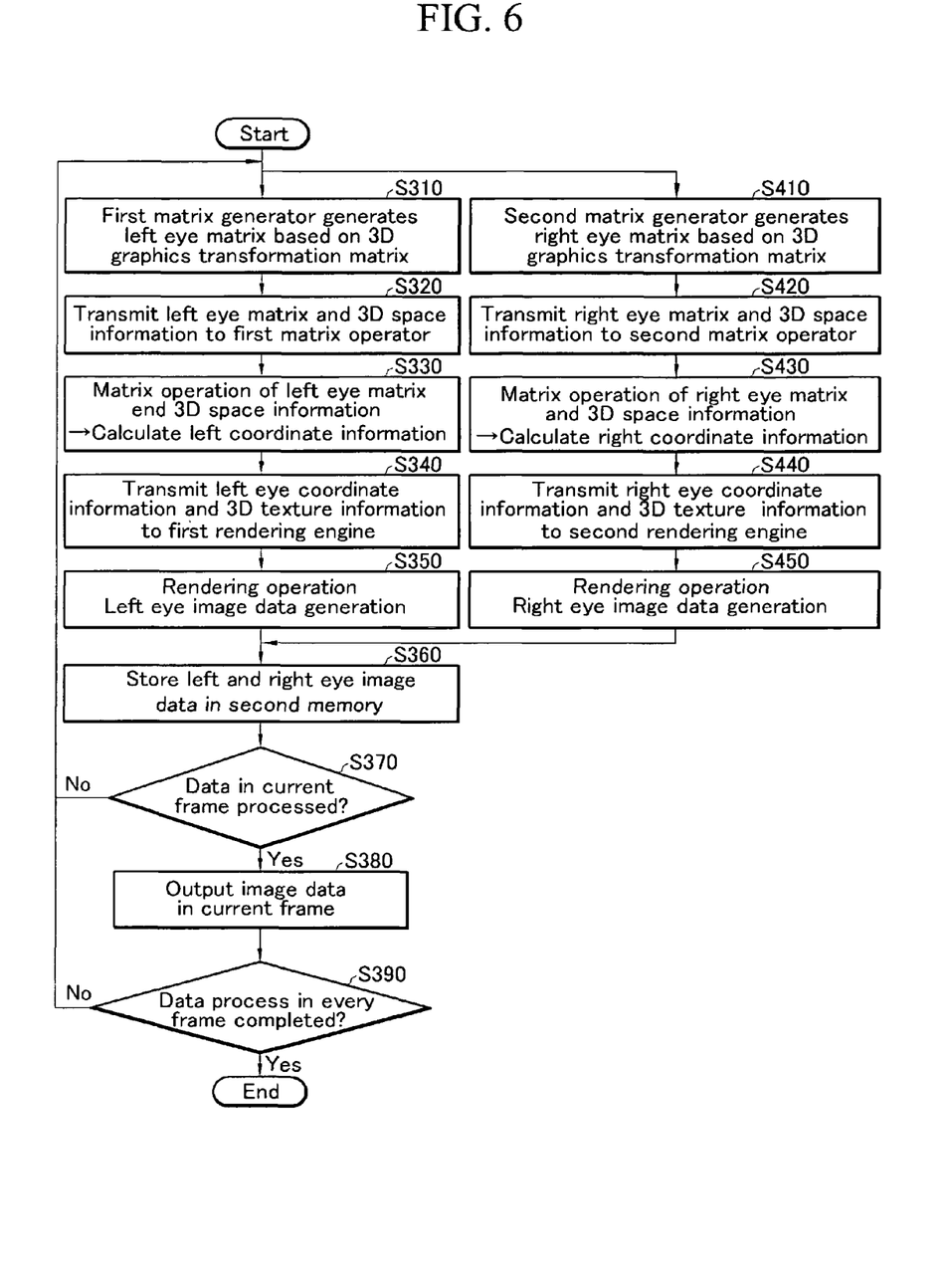
FIG. 6 shows a flowchart representing a process for generating stereoscopic image data by the 3D graphics processor according to the exemplary embodiment of the present invention when the stereoscopic image activation signal is in an active state.

FIG. 6 shows a flowchart representing a process for generating stereoscopic image data by the 3D graphics processor 300 of FIG. 3 according to the exemplary embodiment of the present invention when the stereoscopic image activation signal is in the active state. The process of FIG. 6 will be described in reference to the 3D graphics processor 300 of FIG. 3.

As shown in FIG. 6, the first matrix generator 332 and the second matrix generator 333 respectively generate the left eye matrix and the right eye matrix based on the 3D graphics transformation matrix and the user selection parameter (or user selection parameters) (S310, S410).

The generated left eye and right eye matrixes are respectively transmitted to the first matrix operator 335 and the second matrix operator 336, and the space information is transmitted from the 3D space information awareness unit 310 to the first matrix operator 335 and the second matrix operator 336 through the operator selector 334 (S320, S420). The operator selector 334 outputs the space information concurrently to the first matrix operator 335 and the second matrix operator 336 based on the stereoscopic image activation signal in the active state.

The first matrix operator 335 generates the left eye coordinate information (S330) by performing an operation on the 3D space information input by the operator selector 334 and the left eye matrix, and the second matrix operator 336 generates the right eye coordinate information (S430) by performing an operation on the 3D space information input by the operator selector 334 and the right eye matrix.

The left eye coordinate information generated by the matrix operation is transmitted to the first rendering engine 342 (S340) along with the texture information transmitted by the engine selector 341, and the right eye coordinate information generated by the matrix operation is transmitted to the second rendering engine 343 (S440) along with the texture information transmitted by the engine selector 341.

The first rendering engine 342 and the second rendering engine 343 respectively perform the rendering operation to respectively generate the left eye image data and the right eye image data (S350, S450).

The left eye image data and the right eye image data are stored in respective areas (which may be predetermined) of the second memory 353 by the memory selector 351 (S360).

In addition, the generator selector 331 determines (S370) whether all the data of the current frame have been processed.

When it is determined that all the data of the current frame have not yet been processed, the processes of S310 to S350, S410 to S450, and S360 and S370 are repeatedly performed. When it is determined that all the data of the current frame have been processed, the output unit 360 may output the one frame image data stored in the second memory 353 to the driver 500 shown in FIG. 1 (S380).

The operation of the 3D graphics processor 300 is finished (S390) when processes for the image data of all the frames are completed.

As described, it is not required to additionally generate the stereoscopic image data since the stereoscopic image display device according to the exemplary embodiment of the present invention may display the stereoscopic image by using the 3D graphics data. In addition, a processing time may be reduced since the stereoscopic image may be generated in real time by using the 3D graphics data. The display speed of the stereoscopic image and the image quality may be increased since the user selection parameter (or user selection parameters) may be input according to the user's selection, and the left eye image and the right eye image may be concurrently generated.

While this invention has been described in connection with certain exemplary embodiments, it is to be understood that the invention is not limited to the disclosed embodiments, but, on the contrary, is intended to cover various modifications and equivalent arrangements included within the spirit and scope of the appended claims and their equivalents. By way of example, the present invention may be applied to display devices including a TV and a monitor, and mobile terminals including a mobile telephone and a personal digital assistant (PDA).

The stereoscopic image display device according to the exemplary embodiment of the present invention may display the 2D image and the stereoscopic image by processing the 3D graphics data at a high speed, and the display speed of the stereoscopic image and the image quality may be increased.

Therefore, the processing time may be reduced since an additional process for processing the 3D graphics data as the stereoscopic image data in order to transmit the processed data to the stereoscopic image display device may be omitted, and the input 3D graphics data may be displayed as the stereoscopic image in real time.

In addition, a stereoscopic effect of the stereoscopic image may be adjusted since the space coordinates may be adjusted by the observer when the stereoscopic image data is generated based on the 3D graphics data.

What is claimed is:

1. A stereoscopic image display device having a display unit for displaying an image, the stereoscopic image display device comprising:

a first matrix generator for generating a first matrix based on a 3D graphics transformation matrix and a user selection parameter, the 3D graphics transformation matrix comprising transformation data expressing at least one of a shape or a movement of a 3D object;

a second matrix generator for generating a second matrix based on the 3D graphics transformation matrix and the user selection parameter;

a first matrix operator for generating first view space coordinate information using 3D space information of 3D graphics data and the first matrix;

a second matrix operator for generating second view space coordinate information using the 3D space information of the 3D graphics data and the second matrix;

a first rendering engine for generating first view image data using the first view space coordinate information and texture information of the 3D graphics data;

a second rendering engine for generating second view image data using the second view space coordinate information and the texture information of the 3D graphics data, wherein the first rendering engine and the second rendering engine are configured to concurrently generate the first view image data and the second view image data, respectively, when a stereoscopic image is to be displayed, and to alternately generate 2D image data, when a 2D image is to be displayed;

a memory unit for storing the first view image data and the second view image data;

a driver for receiving the first and second view image data from the memory unit, and driving the display unit to display an image corresponding to the first and second view image data; and an engine selector for selecting at least one of the first and second rendering engines and outputting the texture information to the selected at least one of the first and second rendering engines for generation of the first view image data and the second view image data concurrently by the first and second rendering engines or generation of the 2D image data alternately by the first and second rendering engines.

2. The stereoscopic image display device of claim 1, wherein the display unit displays the 2D image or the stereoscopic image based on a driving signal of the driver.

3. The stereoscopic image display device of claim 2, further comprising a generator selector for receiving a stereoscopic image activation signal indicating whether the 2D image or the stereoscopic image is to be displayed, and for alternately transmitting the 3D graphics transformation matrix to the first matrix generator or the second matrix generator in a frame by frame manner when the stereoscopic image activation signal indicates that the 2D image is to be displayed.

4. The stereoscopic image display device of claim 3, wherein the first and second matrix generators transmit the 3D graphics transformation matrix when the user selection parameter indicates the 2D image.

5. The stereoscopic image display device of claim 4, wherein the generator selector outputs a selection signal indicating that the 3D graphics transformation matrix of a current frame has been transmitted to the first matrix generator or the second matrix generator.

6. A stereoscopic image display device having a display unit for displaying an image, the stereoscopic image display device comprising:
 a first matrix generator for generating a first matrix based on a 3D graphics transformation matrix and a user selection parameter;
 a second matrix generator for generating a second matrix based on the 3D graphics transformation matrix and the user selection parameter;
 a first matrix operator for generating first view space coordinate information using 3D space information of 3D graphics data and the first matrix;
 a second matrix operator for generating second view space coordinate information using the 3D space information of the 3D graphics data and the second matrix;
 a first rendering engine for generating first view image data using the first view space coordinate information and texture information of the 3D graphics data;
 a second rendering engine for generating second view image data using the second view space coordinate information and the texture information of the 3D graphics data;
 a memory unit for storing the first view image data and the second view image data; and
 a driver for receiving the first and second view image data from the memory unit, and driving the display unit to display an image corresponding to the first and second view image data, wherein the display unit displays a 2D image or a stereoscopic image based on a driving signal of the driver;
 a generator selector for receiving a stereoscopic image activation signal indicating whether the 2D image or the stereoscopic image is to be displayed, for alternately transmitting the 3D graphics transformation matrix to the first matrix generator or the second matrix generator in a frame by frame manner when the stereoscopic image activation signal indicates that the 2D image is to be displayed, wherein the first and second matrix generators transmit the 3D graphics transformation matrix when the user selection parameter indicates the 2D image, and for outputting a selection signal indicating that the 3D graphics transformation matrix of a current frame has been transmitted to the first matrix generator or the second matrix generator;
 an operator selector for receiving the stereoscopic image activation signal, and outputting the 3D space information to the first matrix operator or the second matrix operator based on the selection signal when the stereoscopic image activation signal indicates that the 2D image is to be displayed; and
 an engine selector for receiving the stereoscopic image activation signal, and outputting the texture information to the first rendering engine or the second rendering engine based on the selection signal when the stereoscopic image activation signal indicates that the 2D image is to be displayed.

7. The stereoscopic image display device of claim 6, wherein the memory unit comprises:
 a first memory for storing the first view image data output by the first rendering engine; and
 a second memory for storing at least one of the first view image data output by the first rendering engine or the second view image data output by the second rendering engine.

8. The stereoscopic image display device of claim 7, wherein the second memory is driven as a stereoscopic image memory or a 2D image memory based on the stereoscopic image activation signal,
 the stereoscopic image display device further comprising a memory selector for receiving the stereoscopic image activation signal, transmitting the first view image data output by the first rendering engine to the first memory when the stereoscopic image activation signal indicates that the 2D image is to be displayed, and transmitting the first view image data output by the first rendering engine to the second memory when the stereoscopic image activation signal indicates that the stereoscopic image is to be displayed.

9. The stereoscopic image display device of claim 8, further comprising an outputting unit for outputting the image data stored in at least one of the first memory or the second memory to the driver based on the stereoscopic image activation signal and the selection signal.

10. The stereoscopic image display device of claim 1, wherein the user selection parameter comprises an angle formed by a left eye of an observer, an object, and a right eye of the observer, and the first view space coordinate information and the second view space coordinate information become the same when the angle is selected to be 0 degrees.

11. A 3D graphics data processor comprising:
 a geometric engine for generating space coordinate information by using space information of 3D graphics data, the space coordinate information comprising left eye image coordinate information and right eye image coordinate information, the geometric engine comprising:
  a first matrix generator for generating a left eye matrix for the left eye image coordinate information based on a 3D graphics transformation matrix and a user selection parameter, the 3D graphics transformation matrix comprising transformation data expressing at least one of a shape or a movement of a 3D object;
  a second matrix generator for generating a right eye matrix for the right eye image coordinate information based on the 3D graphics transformation matrix and the user selection parameter;

a first matrix operator for performing an operation on the left eye matrix and the space information of the 3D graphics data, and outputting the left eye image coordinate information; and a second matrix operator for performing an operation on the right eye matrix and the space information of the 3D graphics data, and outputting the right eye image coordinate information;

a rendering engine comprising a first engine and a second engine for generating image data using the space coordinate information output from the geometric engine and texture information of the 3D graphics data;

an engine selector for selecting at least one of the first and second engines; and a memory unit for storing the image data output from the rendering engine, wherein the rendering engine is configured to concurrently generate first view image data and second view image data, when a stereoscopic image is to be displayed, and to alternately generate 2D image data, when a 2D image is to be displayed, and wherein the engine selector is for outputting the texture information to the selected at least one of the first and second engines for generation of the first view image data and the second view image data concurrently by the first and second engines or generation of the 2D image data alternately by the first and second engines.

12. The 3D graphics data processor of claim 11, wherein the first engine is for generating left eye image data of the image data using the left eye image coordinate information output from the first matrix operator and the texture information of the 3D graphics data; and the second engine is for generating right eye image data of the image data using the right eye image coordinate information output from the second matrix operator and the texture information of the 3D graphics data.

13. A 3D graphics data processor for processing 3D graphics data of a first frame and a second frame subsequent to the first frame, the 3D graphics data processor comprising:

a geometric engine for generating space coordinate information by performing a matrix operation on space information of 3D graphics data of the first and second frames, the geometric engine comprising:

a first matrix generator for generating a first matrix based on a 3D graphics transformation matrix and a user selection parameter, the 3D graphics transformation matrix comprising transformation data expressing at least one of a shape or a movement of a 3D object;

a second matrix generator for generating a second matrix based on the 3D graphics transformation matrix and the user selection parameter;

a generator selector for transmitting the 3D graphics transformation matrix to the first matrix generator for a first frame period and transmitting the 3D graphics transformation matrix to the second matrix generator for a second frame period;

a first matrix operator for performing an operation on the first matrix and the space information of the 3D graphics data for the first frame period and outputting first coordinate information;

a second matrix operator for performing an operation on the second matrix and the space information of the 3D graphics data for the second frame period and outputting second coordinate information;

a first rendering engine and a second rendering engine for generating image data using the space coordinate information output from the geometric engine and texture information of the 3D graphics data;

an engine selector for selecting at least one of the first and second rendering engines; and a memory unit for storing the image data output from the first and second rendering engines, wherein the first rendering engine and the second rendering engine are configured to concurrently generate first view image data and second view image data, respectively, when a stereoscopic image is to be displayed, and to alternately generate 2D image data, when a 2D image is to be displayed, and wherein the engine selector is for outputting the texture information to the selected at least one of the first and second rendering engines for generation of the first view image data and the second view image data concurrently by the first and second rendering engines or generation of the 2D image data alternately by the first and second rendering engines.

14. The 3D graphics data processor of claim 13, wherein the generator selector outputs a selection signal indicating that a current frame is the first frame or the second frame, the 3D graphics data processor further comprising an operator selector for transmitting the space information to the first matrix operator or the second matrix operator based on the selection signal.

15. A 3D graphics data processor for processing 3D graphics data, the 3D graphics data processor comprising:

at least one matrix generator configured to generate a first matrix and a second matrix using a 3D graphics transformation matrix, the 3D transformation matrix comprising transformation data expressing at least one of a shape or a movement of a 3D object;

a first rendering engine for generating first image data using texture information of the 3D graphics data and first coordinate information calculated by using the first matrix and space information of the 3D graphics data;

a second rendering engine for generating second image data using the texture information of the 3D graphics data and second coordinate information calculated by using the second matrix and the space information of the 3D graphics data;

a first memory for storing the first image data;

a second memory for storing, based on a control signal, both the first and second image data or either the first image data or the second image data;

an engine selector for selecting at least one of the first and second rendering engines; and a memory selector for transmitting the first image data output from the first rendering engine to the first memory or the second memory based on the control signal, wherein the first rendering engine and the second rendering engine are configured to concurrently generate the first image data and the second image data, respectively, when a stereoscopic image is to be displayed, according to the selection by the engine selector, and to alternately generate 2D image data, when a 2D image is to be displayed, according to the selection by the engine selector, and wherein the engine selector is for outputting the texture information to the selected at least one of the first and second rendering engines for generation of the first image data and the second image data concurrently by the first and second rendering engines or generation of the 2D image data alternately by the first and second rendering engines.

16. The 3D graphics data processor of claim 15, wherein the first image data comprises left eye image data, the second image data comprises right eye image data, and the second memory comprises a stereoscopic image data storage memory capable of storing the first image data and the second image data.

17. A stereoscopic image display device comprising:

a display unit for displaying an image;

a controller for receiving a synchronization signal, 3D graphics data, and a user selection parameter for modifying a stereoscopic effect level, outputting a control signal based on the synchronization signal, and outputting a stereoscopic image data signal, generated by combining left eye image data and right eye image data generated by performing matrix operations using the 3D graphics data and the user selection parameter and left and right eye matrices, respectively, wherein the left and right eye matrices are each generated based on a 3D graphics transformation matrix comprising transformation data expressing at least one of a shape or a movement of a 3D object, wherein the controller concurrently generates the left and right eye image data, when a stereoscopic image is to be displayed, and alternately generates 2D image data, when a 2D image is to be displayed;

a driver for driving the display unit based on the control signal and the stereoscopic image data signal to display the image on the display unit;

a first rendering engine for generating the left eye image data;

a second rendering engine for generating the right eye image data; and an engine selector for selecting at least one of the first and second rendering engines and outputting texture information to the selected at least one of the first and second rendering engines for generation of the left eye image data and the right eye image data concurrently by the first and second rendering engines, according to the selection by the engine selector, or generation of the 2D image data alternately by the first and second rendering engines, according to the selection by the engine selector.

18. The stereoscopic image display device of claim 17, wherein the controller receives a stereoscopic image activation signal, and selectively generates the stereoscopic image data signal or the 2D image data according to the stereoscopic image activation signal.

19. The stereoscopic image display device of claim 17, wherein the user selection parameter comprises a distance between an object displayed according to the stereoscopic image data signal and left and right eyes of an observer, and an angle formed by the left eye of the observer, the object, and the right eye of the observer.

20. A stereoscopic image display device comprising:

a display unit for displaying a stereoscopic image;

a driver for driving the display unit;

a controller for externally receiving 3D graphics data, extracting space coordinate information and texture information from the 3D graphics data, generating stereoscopic image data based on the space coordinate information and the texture information, and outputting the generated stereoscopic image data to the driver, wherein the controller comprises:

an engine selector for selecting at least one of a first rendering engine and a second rendering engines; and a 3D graphics data processor adapted to receive a stereoscopic image activation signal indicating that the stereoscopic image is to be displayed on the display unit, and to generate the stereoscopic image using first and second matrices generated using a 3D graphics transformation matrix, the 3D transformation graphics matrix comprising transformation data expressing at least one of a shape or a movement of a 3D object, wherein the first and second rendering engines concurrently generate first and second view image data, respectively, when the stereoscopic image is to be displayed, according to the selection by the engine selector, and alternately generate 2D image data, respectively, when a 2D image is to be displayed, according to the selection by the engine selector, and wherein the engine selector is for outputting the texture information to the selected at least one of the first and second rendering engines for generation of the first view image data and the second view image data concurrently by the first and second rendering engines or generation of the 2D image data alternately by the first and second rendering engines.

21. The stereoscopic image display device of claim 20, wherein the 3D graphics data processor further comprises:

a space information awareness unit for extracting the space coordinate information of the 3D graphics data;

a space information operator for respectively generating a left eye space coordinate and a right eye space coordinate by modifying the space coordinate information extracted by the space information awareness unit to generate left eye image data and right eye image data;

a texture information awareness unit for extracting texture information of the 3D graphics data;

an image generator for generating the left eye image data and the right eye image data by combining the texture information with the left eye space coordinate and the right eye space coordinate, respectively; and an image combiner for generating the stereoscopic image data by combining the left eye image data and the right eye image data generated by the image generator according to a configuration of the display unit.

22. The stereoscopic image display device of claim 21, wherein the display unit comprises:

a display panel for displaying an image corresponding to the stereoscopic image data input from the driver; and a barrier arranged in correspondence to the display panel, and being driven based on a driving signal of the driver.

23. The stereoscopic image display device of claim 21, wherein the space information operator, the image generator, and the image combiner are driven when the stereoscopic image activation signal is input.

24. The stereoscopic image display device of claim 21, wherein:

the space information operator calculates a first space coordinate of an object based on space coordinate information by performing a matrix operation, the first space coordinate determined from an angle to the object in reference to a left eye of an observer, outputs the calculated first space coordinate as the left eye space coordinate for a left eye image, and calculates a second space coordinate of the object based on the space coordinate information by performing the matrix operation, the second space coordinate determined from an angle to the object in reference to a right eye of the observer, and outputs the calculated second space coordinate as the right eye space coordinate for a right eye image.

25. The stereoscopic image display device of claim 21, wherein the space information operator is capable of modifying the space coordinate information and is capable of setting a modification level of the space coordinate information according to a user's selection.

26. A driving method of a stereoscopic image display device having a display unit for displaying a stereoscopic image, the driving method comprising:
inputting 3D graphics data comprising space coordinate information and texture information of an object to the stereoscopic image display device;
converting the 3D graphics data into stereoscopic image data by performing matrix operations using the 3D graphics data and a user selection parameter for modifying a stereoscopic effect level and first and second matrices each generated based on a 3D graphics transformation matrix, the 3D transformation matrix comprising transformation data expressing at least one of a shape or a movement of a 3D object; and
displaying the stereoscopic image with the display unit by using the stereoscopic image data,
wherein first and second rendering engines concurrently generate first and second view image data, respectively, when the stereoscopic image is to be displayed, and alternately generate 2D image data, when a 2D image is to be displayed, and
wherein an engine selector selects at least one of the first and second rendering engines and outputs the texture information to the selected at least one of the first and second rendering engines for generation of the first view image data and the second view image data concurrently by the first and second rendering engines or generation of the 2D image data alternately by the first and second rendering engines.

27. The driving method of claim 26, wherein the converting of the 3D graphics data into the stereoscopic image data comprises:
extracting the space coordinate information and the texture information;
modifying a space coordinate in order to generate left eye image data and right eye image data;
generating the left eye image data and the right eye image data by using the texture information and the modified space coordinate; and
combining the generated left eye image data and right eye image data based on a configuration of the display unit.

28. A 3D graphics data processor of a stereoscopic image display device for displaying a stereoscopic image, the 3D graphics data processor comprising:
a space information awareness unit for receiving 3D graphics data comprising space coordinate information and texture information of an object, and extracting the space coordinate information;
a space information operator for modifying the space coordinate information extracted by the space information awareness unit to generate left eye image data and right eye image data;
a texture information awareness unit for extracting the texture information from the 3D graphics data;
an image generator for receiving the space coordinate information and the texture information respectively from the space information operator and the texture information awareness unit, and for generating the left eye image data and the right eye image data by performing at least one 3D matrix operation using a matrix generated based on a 3D graphics transformation matrix, the 3D graphics transformation matrix comprising transformation data expressing at least one of a shape or a movement of a 3D object,
wherein the image generator concurrently generates first and second view image data, when the stereoscopic image is to be displayed, and alternately generates 2D image data, when a 2D image is to be displayed;
an image combiner for combining the left eye image data and the right eye image data generated by the image generator according to a configuration of the display device;
a first rendering engine for generating the first view image data;
a second rendering engine for generating the second view image data; and
an engine selector for selecting at least one of the first and second rendering engines and outputting the texture information to the selected at least one of the first and second rendering engines for generation of the first view image data and the second view image data concurrently by the first and second rendering engines, according to the selection by the engine selector, or generation of the 2D image data alternately by the first and second rendering engines, according to the selection by the engine selector.

29. The 3D graphics data processor of claim 28, wherein the space information awareness unit outputs a space coordinate corresponding to observing an object at an angle to the object in reference to a left eye of an observer as a space coordinate for a left eye image based on the space coordinate information of the 3D graphics data by performing the at least one 3D matrix operation, and outputs another space coordinate corresponding to observing the object at an angle to the object in reference to a right eye of the observer as a space coordinate for a right eye image.

30. The 3D graphics data processor of claim 29, wherein the space information operator is capable of adjusting the matrix used for the matrix operation by the observer.

31. The stereoscopic image display device of claim 3, wherein the generating the first and second view image data of a subsequent frame starts before generating the first and second view image data of a previous frame is completed when the 3D graphics data is displayed as the 2D image.

32. The stereoscopic image display device of claim 1, wherein the user selection parameter comprises: an angle formed by a left eye of an observer, an object, and a right eye of the observer; and a distance between the object and the observer.

* * * * *